US006649694B2

(12) United States Patent
Jordens et al.

(10) Patent No.: US 6,649,694 B2
(45) Date of Patent: Nov. 18, 2003

(54) PROCESS FOR PRODUCING ETHYLENE-α-OLEFIN INTERPOLYMER FILMS

(75) Inventors: Kurt Joseph Jordens, Longview, TX (US); Stephen Wayne Coe, Longview, TX (US); Scott Arnold Hanson, Johnson City, TN (US); Jeffrey James Vanderbilt, Longview, TX (US); Bradley Scott Westbrook, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 16 days.

(21) Appl. No.: 10/027,556

(22) Filed: Dec. 21, 2001

(65) Prior Publication Data
US 2003/0134975 A1 Jul. 17, 2003

(51) Int. Cl.⁷ .......................... C08L 51/04; C08L 51/06; C08F 210/16
(52) U.S. Cl. .............................. 525/64; 525/69; 525/70; 525/285; 525/242
(58) Field of Search .............................. 525/64, 69, 70, 525/285, 242

(56) References Cited

U.S. PATENT DOCUMENTS

| | | |
|---|---|---|
| 3,517,086 A | 6/1970 | Shirayama et al. |
| 3,886,227 A | 5/1975 | VanBrederode et al. |
| 4,087,587 A | 5/1978 | Shida et al. |
| 4,230,830 A | 10/1980 | Tanny et al. |
| 4,440,911 A | 4/1984 | Inoue et al. |
| 4,452,942 A | 6/1984 | Shida et al. |
| 4,472,555 A | 9/1984 | Schmukler et al. |
| 4,612,155 A | 9/1986 | Wong et al. |
| 4,684,576 A | 8/1987 | Tabor et al. |
| 4,737,547 A | 4/1988 | White |
| 4,762,882 A | 8/1988 | Okano et al. |
| 4,762,890 A | 8/1988 | Strait et al. |
| 5,066,542 A | 11/1991 | Tabor et al. |
| 5,115,033 A | 5/1992 | Wong |
| 5,180,788 A | 1/1993 | Vroomans |
| 5,705,565 A | 1/1998 | Hughes et al. |
| 5,708,080 A | 1/1998 | Tsutsui et al. |
| 5,728,776 A | 3/1998 | Takemura et al. |
| 5,834,557 A | 11/1998 | Tsutsui et al. |
| 6,214,924 B1 * | 4/2001 | Bieser et al. ............... 524/515 |
| 6,514,583 B1 | 2/2003 | Ahlgren et al. |

FOREIGN PATENT DOCUMENTS

| | | |
|---|---|---|
| EP | 0171777 A2 | 2/1986 |
| EP | 0 276570 A2 | 8/1988 |
| GB | 2 116 187 A | 9/1983 |
| WO | WO 90 01504 A1 | 2/1990 |
| WO | WO 00/04088 | 1/2000 |
| WO | WO 00/04089 | 1/2000 |
| WO | WO 00/04090 | 1/2000 |
| WO | WO 01 36495 A1 | 5/2001 |

* cited by examiner

Primary Examiner—James J. Seidleck
Assistant Examiner—Olga Asinovsky
(74) Attorney, Agent, or Firm—Steven A. Owen; Bernie Graves

(57) ABSTRACT

There is disclosed a process for producing films from ethylene-α-olefin interpolymers, which films have, in combination, the properties of improved surface haze, improved stiffness, and improved color. The process involves incorporating from about 0.1 to less than 1% by weight, of a functionalized ethylene homopolymer or functionalized ethylene interpolymer into an ethylene-α-olefin interpolymer-containing composition, and forming a film from the composition.

6 Claims, No Drawings

PROCESS FOR PRODUCING ETHYLENE-α-OLEFIN INTERPOLYMER FILMS

FIELD OF THE INVENTION

This invention relates to a process for producing films of ethylene-α-olefin interpolymers having, in combination, the properties of improved surface haze, improved stiffness, and improved color. The process involves forming a film from a composition comprising an ethylene-α-olefin interpolymer and an amount of from about 0.1% to less than 1% by weight, based on the composition, of a functionalized ethylene homopolymer or a functionalized ethylene-α-olefin interpolymer.

BACKGROUND OF THE INVENTION

Ethylene-α-olefin interpolymer films are often employed in packaging and other applications where appearance is important. Usually in the case of packaging, it is desired that the film be optically transparent and glossy so that the product packaged within will be more attractive. Accordingly, it is desirable to provide a film that has not only improved surface haze properties, but also improved stiffness and color.

SUMMARY OF THE INVENTION

The novel process of the present invention for the production of ethylene-α-olefin interpolymer films having improved surface haze, improved stiffness and improved color is comprised as follows. A composition comprising an ethylene-α-olefin interpolymer and an amount of from about 0.1 to less than 1% by weight, based on the composition, of a functionalized ethylene homopolymer or a functionalized ethylene-α-olefin interpolymer, as defined herein, is prepared. The composition is then formed into a film in any manner known in the art. In a preferred embodiment of the process, the film is formed utilizing the well-known blown film technique.

DETAILED DESCRIPTION OF THE INVENTION

The novel process of the present invention for the production of ethylene-α-olefin interpolymer films having improved surface haze, improved stiffness and improved color is comprised as follows. A composition comprising an ethylene-α-olefin interpolymer and an amount of from about 0.1 to less than 1% by weight, based on the composition, of a functionalized ethylene homopolymer or a functionalized ethylene-α-olefin interpolymer, as defined herein, is prepared. The composition is then formed into a film in any manner known in the art. In a preferred embodiment of the process, the film is formed utilizing the well-known blown film technique.

More particularly, the ethylene-α-olefin interpolymer used in preparing the compositions, that are formed into the films of the present invention, is any ethylene-α-olefin interpolymer comprising ethylene and at least one, or more, other α-olefin wherein the ethylene content is at least about 50% by weight of the total monomers comprising the interpolymer. Preferably, the ethylene content of the interpolymer ranges from greater than about 50% to about 99% by weight of the total monomers comprising the interpolymer. The α-olefin monomer(s) preferably contain from 3 to about 16 carbon atoms. Exemplary α-olefins that may be utilized herein are propylene, 1-butene, 1-pentene, 1-hexene, 1-heptene, 1-octene, 4-methyl-1-pentene, 1-decene, 1-dodecene, 1-hexadecene and the like. Also utilizable herein as the α-olefin monomer are non-conjugated dienes and olefins formed in situ in the polymerization medium. The ethylene-α-olefin interpolymers may be linear or may contain Theologically significant long chain branches, such as the "substantially linear" polymers, and may be produced by any process, such as solution, gas phase, or slurry loop, and with any olefin polymerization catalyst, such as the constrained geometry, metallocene type, Ziegler Natta types, or chromium oxide types. The ethylene-α-olefin interpolymer is present in the compositions utilized to form the films of the present invention, in an amount of from about greater than 99% to about 99.9% by weight of the composition.

The functionalized ethylene homopolymer or functionalized ethylene-α-olefin interpolymer suitable for use herein are defined as follows. The polyethylene that is functionalized may be any homopolymer of ethylene. The interpolymer of ethylene that is functionalized and is suitable for use in preparing the compositions from which the films of the present invention are formed is any ethylene-α-olefin interpolymer comprising ethylene and at least one, or more, other α-olefin wherein the ethylene content is at least about 50% by weight of the total monomers comprising the interpolymer. Preferably, the ethylene content of the interpolymer ranges from greater than about 50% to about 99% by weight of the total monomers comprising the interpolymer. The α-olefin monomer(s) preferably contain from 3 to about 16 carbon atoms. Exemplary α-olefins that may be utilized herein are propylene, 1-butene, 1-pentene, 1-hexene, 1-heptene, 1-octene, 4-methyl-1-pentene, 1-decene, 1-dodecene, 1-hexadecene and the like. Also utilizable herein as the α-olefin monomer are non-conjugated dienes and olefins formed in situ in the polymerization medium. The ethylene-α-olefin interpolymers may be linear or may contain Theologically significant long chain branches, such as the "substantially linear" polymers, and may be produced by any process, such as solution, gas phase, or slurry loop, and with any olefin polymerization catalyst, such as the constrained geometry, metallocene types, Ziegler Natta types, or chromium oxide types.

In preparing the functionalized ethylene homopolymers or ethylene-α-olefin interpolymers suitable for use herein, there may be utilized as the functionalizing agent any unsaturated monomer containing one or more carboxylic acid, carboxylic acid ester, or acid anhydride group. Examples of suitable functionalizing agents herein are carboxylic acids such as acrylic and methacrylic acid, carboxylic acid esters such as methyl acrylate and methyl methacrylate, and acid anhydrides such as maleic anhydride. Further exemplary functionalizing agents suitable for use herein are unsaturated monocarboxylic acids and polycarboxylic acids and cyclic acid anhydrides. Specifically included herein are acids such as maleic acid, fumaric acid, himic acid, itaconic acid, citraconic acid, mesaconic acid, acrylic acid, methacrylic acid, crotonic acid, isocrotonic acid, and acid anhydrides such as maleic anhydride and himic anhydride. Preferred for use herein as the functionalizing agent is maleic anhydride. Mixtures of functionalizing agents may be utilized in the present invention. The functionalizing agent is utilized in any amount that will functionalize the ethylene homopolymer and/or interpolymer such that the functionalized ethylene homopolymer and/or interpolymer will contain from about 0.01 to about 3% by weight of the at least one functionalizing agent, based on the functionalized ethylene homopolymer or copolymer.

Preferably, the functionalizing agent will be utilized in an amount of from about 0.20 to about 10 weight percent, based on the weight of the ethylene component in order to produce the desired functionalized polymer.

The functionalized ethylene homopolymers and ethylene-α-olefin interpolymers utilized herein may be prepared by any process known in the art. Exemplary of such processes for preparing functionalized ethylene homopolymers and copolymers are U.S. Pat. Nos. 4,612,155; 4,762,890; 5,180,788; 5,705,565; and 5,728,776; and International Publication No. WO 01/36495 A1.

The functionalized ethylene homopolymer or ethylene-α-olefin interpolymer is present in the compositions utilized to form the films of the present invention, in an amount of from about 0.1 to less than 1% by weight of the composition.

The compositions, from which the novel films are formed, comprising from greater than 99 to about 99.9% by weight of the composition, of the ethylene-α-olefin interpolymer described herein, and from about 0.1 to less than 1% by weight of the composition, of the functionalized ethylene homopolymer or functionalized ethylene-α-olefin interpolymer described herein are prepared by any method known in the art. For example, the components of the composition may be admixed together on a conventional mixing machine such as a mill roll, an extruder or a continuous mixer. In preparing the compositions of the examples herein, pellets of the components were placed into a fiber drum and mixed for five minutes on an INS Plastic Tumbling unit. In more detail, in each of the following examples wherein a composition is prepared, the following procedure was utilized. A predetermined amount of ethylene-α-olefin interpolymer and functionalized ethylene homopolymer or functionalized ethylene-α-olefin interpolymer, both described herein, were weighed using a Toledo scale and placed into a fiber drum. The fiber drum was then placed on an INS Plastic Tumbling unit and mixed for a period of five minutes yielding the desired composition.

For many purposes, it may be desirable to incorporate other conventional additives with the compositions utilized in the present invention. For example, there may be added antioxidants, heat and light stabilizers, dyes, antistatic agents, lubricants, preservatives, processing aids, slip agents, antiblocking agents, pigments, flame retardants, blowing agents, and the like.

The compositions may be fabricated into films by any technique known in the art, and are particularly suitable for use with blown-film techniques. In further detail, the films of the examples were blown under the following conditions.

The tumbled pellet blends were fed to the hopper of a 2.5-inch (64-mm) Egan extruder, having a length to diameter ratio of 24/1 and a barrier screw. The extruder was equipped with a 6-inch (152-mm) diameter annular die having a die gap of 88 mil (2.2 mm). A dual-lip air ring was used for cooling the external surface of the tubular film as it exited the annular die. A "hump-back" extruder temperature profile was employed with setpoints of 193, 232, 221, 216, and 204° C. for zones 1 through 5, respectively, and a die setpoint of 218° C. was employed. A throughput rate of 69 kg/h was maintained while producing films of 1-mil (0.025-mm) thickness with a blow-up ratio of 2.4. A frost line height of 38 cm was maintained during the film formation. Films were wound into rolls of about 60 linear meters and aged for 40 hours at standard lab conditions (23° C. and 50% relative humidity) before testing.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. Moreover, all U.S. patents referred to herein are incorporated by reference in their entirety.

EXAMPLES

In the following examples, the test procedures listed below were used in evaluating the properties of the films herein.

Total film haze was measured according to ASTM D1003 with a BYK Gardner Haze-gard Plus. In order to measure the internal haze component, a non-interacting liquid of similar refractive index (1.48) to the polymer (1.51) was spread over the rough surface to "fill-in" the rough surface texture. The haze measured on such a coated sample represented the component originating from the bulk, or internal semicrystalline structure only (internal haze). The surface haze component was calculated by subtracting the internal haze from the total haze.

Acid number (AN) was measured according to ASTM D1386-83 with the following modifications: A 0.05N sodium hydroxide in methanol solution was substituted for the 0.1N potassium hydroxide in ethanol and the sample size was increased from between 1 and 2 g to 5 g, and the weighing accuracy was changed from 0.001 to 0.0001 g. The percent by weight of grafted functionalizing agent in the final functionalized polyethylene is equal to 0.178•AN.

Melt index (MI) and Melt Flow Ratio (MFR) were measured in accordance with ASTM D1238, conditions 190/2.16 and 190/21.6.

Secant modulus (at 1% strain) was measured in accordance with ASTM D882. Due to the anisotropic nature of polyethylene blown films, modulus measurements were made by testing the blown film in both the extrusion, or machine direction (MD), and the hoop, or transverse direction (TD).

Yellowness index of pellets was measured according to ASTM E313-96 with a BYK-Gardner Color-View Spectrophotometer. Pellets composed of blends of polyethylene and functionalized polyethylene were prepared by melt extrusion of a tumbled pellet/pellet blend. Melt extrusion was carried out with a 1.25-in (31.8-mm) single screw Killion extruder at a screw speed of 50 rpm with the following temperature profile (barrel zones 1-4/adapter/clamp ring): 177/221/216/216/216/216° C. Pellets were fashioned with a standard water bath and pelletizer and conditioned at 23° C. and 50% humidity for at least 24 hours before measurement of yellowness index.

Density was measured in accordance with ASTM D4883-89 with a Haake V Tecrad density measurement system.

Example 1

In this example, blown films were prepared as described herein. The major component of the composition from which the films were formed is ethylene/1-hexene interpolymer containing 8.3 weight % 1-hexene and having MI of 0.85 dg/min, and density of 0.917 g/cm$^3$ (referred to herein as LLDPE). The compositions also comprised varying amounts of a maleic anhydride grafted ethylene/1-hexene interpolymer (referred to herein as mal-LLDPE) having an acid number of 7, a maleic anhydride content of 1.2% by weight, and an MI of 8 dg/min.

The maleic anhydride grafted ethylene/1-hexene interpolymer (referred to as mal-LLDPE herein) used in this example was prepared as follows. Ethylene/1-hexene interpolymer having a density of 0.917 g/cm³, a melt index of 0.8 dg/min, and a Melt Flow Ratio of 27 was prepared utilizing a continuous polymerization process in a fluidized-bed reactor for gas-phase polymerization, consisting of a vertical cylinder of diameter 0.74 meters and height seven meters and surmounted by a velocity reduction chamber. The reactor was provided in its lower part with a fluidization grid and with an external line for recycling gas, which connects the top of the velocity reduction chamber to the lower part of the reactor, at a point below the fluidization grid. The recycling line was equipped with a compressor for circulating gas and a heat transfer means such as a heat exchanger. In particular the lines for supplying ethylene, 1-hexene, hydrogen and nitrogen, which represent the main constituents of the gaseous reaction mixture passing through the fluidized bed, feed into the recycling line.

Above the fluidization grid, the reactor contained a fluidized bed weighing 800 lb (360 kg) consisting of a linear low-density polyethylene powder made up of particles with a weight-average diameter of about 1.3 mm. The gaseous reaction mixture, which contained ethylene, 1-hexene, hydrogen, nitrogen and minor amounts of other components, passed through the fluidized bed under a pressure of about 296 psig (2.04 MPa) with an ascending fluidization speed of about 1.7 ft/s (52 cm/s).

The transition metal component of the Ziegler-Natta catalyst used was prepared in accordance with Example 1-a of European Patent Application EP 0 703 246 A1. The Ziegler-Natta catalyst was used in prepolymer form, and was prepared in accordance with Example 1-b of European Patent Application EP 0 703 246 A1. A prepolymer containing about 35.7 g of polyethylene per millimole of titanium, with a tri-n-octylaluminum (TnOA) to titanium molar ratio of about 1.0, was thus obtained.

The catalyst was introduced intermittently into the reactor, the said catalyst comprising magnesium, chlorine and titanium. The rate of introduction of prepolymer into the reactor was adjusted to achieve the desired production rate. During the polymerization, a solution of trimethylaluminum (TMA) in n-hexane, at a concentration of about 2 weight percent, was introduced continuously into the line for recycling the gaseous reaction mixture, at a point situated downstream of the heat transfer means. The feed rate of TMA is expressed as a molar ratio of TMA to titanium (TMA/Ti), and is defined as the ratio of the TMA feed rate (in moles of TMA per hour) to the prepolymer feed rate (in moles of titanium per hour). Simultaneously, a solution of tetrahydrofuran (THF) in n-hexane, at a concentration of about 1 weight percent, was introduced continuously into the line for recycling the gaseous reaction mixture. The feed rate of THF is expressed as a molar ratio of THF to titanium (THF/Ti), and is defined as the ratio of the THF feed rate (in moles of THF per hour) to the prepolymer feed rate (in moles of titanium per hour). Dinitrogen monoxide ($N_2O$) was added as a gas to the line for recycling the gaseous reaction mixture. The concentration of $N_2O$ in the gas phase polymerization medium is expressed in units of parts per million (ppm) by volume.

A solution of chloroform ($CHCl_3$) in n-hexane, at a concentration of about 0.5 weight percent, was introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the prepolymer feed rate (in moles of titanium per hour). The $CHCl_3$ was added as a solution in n-hexane to the line for recycling the gaseous reaction mixture.

The continuous gas phase process conditions are given in Table 1. The molar ratio TMA/Ti was 4. The molar ratio $CHCl_3$/Ti was 2.0. The molar ratio THF/Ti was 0.3. The concentration of dinitrogen monoxide ($N_2O$) in the polymerization medium was 304 ppm by volume. 1-Hexene was used as comonomer. Under these conditions there was produced the ethylene/1-hexene interpolymer having a density of 0.917 glcm³, and an MI of 0.8 dg/min. This is the polymer that was functionalized in Example 1.

TABLE 1

| | |
|---|---|
| Reactor Pressure, psig (MPa) | 296(2.04) |
| Reactor Temperature, ° C. | 86 |
| Fluidized Bulk Density, lb/ft³ (g/cm³) | 16.3(0.261) |
| Reactor Bed Height, ft (meter) | 10.7(3.26) |
| Ethylene, mole % | 50.4 |
| $H_2/C_2^1$ | 0.124 |
| $C_6/C_2^2$ | 0.117 |
| TMA/Ti³ | 4 |
| $CHCl_3$/Ti⁴ | 2.0 |
| THF/Ti⁵ | 0.3 |
| $N_2O$, ppm by volume | 304 |
| Prepolymer Rate, lb/h (kg/h) | 0.73(0.33) |
| Production Rate, lb/h (kg/h) | 205(93) |
| Space Time Yield, kg/h-m³ | 66.9 |
| Productivity, mass ratio | 281 |
| Activity⁶ | 244 |
| Residual Titanium, ppm | 4.8 |

¹hydrogen to ethylene molar ratio;
²1-hexene to ethylene molar ratio;
³trimethylaluminum to titanium molar ratio;
⁴chloroform to titanium molar ratio;
⁵tetrahydrofuran to titanium molar ratio;
⁶units of gram PE · (mmole Ti)⁻¹ · h⁻¹ · (0.1 MPa)⁻¹]

The maleic anhydride grafted ethylene/1-hexene interpolymer (mal-LLDPE herein) was then prepared utilizing a 40-mm×55-L/D (length/diameter) Berstorff ZE 40A twin screw extruder, produced and sold by Berstorff Corporation, of Florence, Ky. The extruder screw speed was set at 270 rpm. Pellets of the ethylene/1-hexene interpolymer having a density of 0.917 g/cc, a melt index of 0.8 dg/min, and a Melt Flow Ratio of 27, were fed to the feed throat of the extruder by a volumetric pellet feeder at a rate of 45 kg/h, and the pellets were melted in barrels 1 and 2. Maleic anhydride was injected at a rate of 1.1 kg/h through an injection device located between barrels 2 and 3 of the extruder. The maleic anhydride was then mixed with the interpolymer in three sequential reaction/mixing zones, each separated from the other by reverse conveying elements. The three sequential mixing/reaction zones were maintained at a temperature of 358° C. The resulting maleated interpolymer was passed under two sequential vacuum zones with 6840 Pa of vacuum, and 6960 Pa of vacuum, respectively, to remove volatiles. The resulting maleic anhydride grafted ethylene-1/hexene interpolymer (herein mal-LLDPE) was recovered from the end of the extruder by a conventional strand bath and pelletizer system. Analysis revealed that the mal-LLDPE had a melt index of 8 dg/min, an acid number of 7, and a maleic anhydride content of 1.2% by weight of the interpolymer.

As mentioned herein, films were produced from the following compositions comprising the LLDPE and varying proportions of the mal-LLDPE. The data are reported in Table 2 below.

TABLE 2

| mal-LLDPE content (wt. %) | total haze (%) | internal haze (%) | surface haze (%) | MD secant modulus (Pa) | TD secant modulus (Pa) |
|---|---|---|---|---|---|
| 0 (100% LLDPE) | 12.3 | 3.3 | 9.0 | $1.99(10^8)$ | $2.21(10^8)$ |
| 0.1 | 6.4 | 2.6 | 3.8 | $2.08(10^8)$ | $2.59(10^8)$ |
| 0.2 | 6.3 | 2.6 | 3.7 | $2.25(10^8)$ | $2.63(10^8)$ |
| 0.5 | 5.5 | 2.5 | 3.0 | $2.23(10^8)$ | $2.85(10^8)$ |
| 1 | 5.7 | 2.2 | 3.5 | $2.37(10^8)$ | $2.88\ 10^8)$ |
| 2 | 5.6 | 2.2 | 3.4 | $2.29(10^8)$ | $3.06(10^8)$ |

From the data in Table 2, it is observed that films formed from the compositions described herein comprising the required amounts of ethylene-α-olefin interpolymer and functionalized component are characterized by having decreased surface haze, thereby having improved transparency. This is in comparison with a film formed from the LLDPE. Further, from the data in Table 2, it is observed that the films of the present invention formed from the compositions comprising the required amounts of the components have increased moduli, as compared to films formed from the LLDPE. The increased moduli values indicate that the films have increased stiffness.

The compositions of Table 2 that were formed into films, were measured for yellowness index prior to being formed into films. The yellowness index values are reported below in table 3.

TABLE 3

| mal-LLDPE content (wt. %) | yellowness index |
|---|---|
| 0 (100% LLDPE) | 2.42 ± 0.36 |
| 0.1 | 2.33 ± 0.21 |
| 0.2 | 2.28 ± 0.12 |
| 0.5 | 2.87 ± 0.32 |
| 1 | 3.42 ± 0.08 |
| 2 | 4.85 ± 0.21 |

From the data in Table 3, it is observed that as the amount of mal-LLDPE blended with the LLDPE reaches a level of 1% by weight, the yellowness index of the blend composition is undesirably increased, as compared to the yellowness index of the composition containing no mal-LLDPE. Accordingly, films prepared from the compositions containing the required content of mal-LLDPE, as described herein, will have improved color.

It should be clearly understood that the forms of the invention herein described are illustrative only and are not intended to limit the scope of the invention. The present invention includes all modifications falling within the scope of the following claims.

We claim:

1. A process for producing films characterized by having decreased surface haze, increased secant modulus and improved color, comprising forming a film from a composition comprising from greater than 99% to about 99.9% by weight of an ethylene-α-olefin interpolymer, based on the composition, and from about 0.1% to less than 1% by weight of a functionalized component selected from the group consisting of functionalized ethylene homopolymer and functionalized ethylene-α-olefin interpolymer, wherein the functionalized component comprises from about 0.01% to about 3% by weight of functionalizing agent based on the functionalized component.

2. The process according to claim 1 wherein the ethylene-α-olefin interpolymer comprises ethylene and at least one, or more, other α-olefin, and wherein the ethylene content is at least about 50% by weight of the interpolymer.

3. The process according to claim 2 wherein the other α-olefin has from 3 to about 16 carbon atoms.

4. The process according to claim 1 wherein the functionalized ethylene-α-olefin interpolymer comprises a functionalized interpolymer of ethylene-α-olefin wherein the ethylene content is at least about 50% by weight of the interpolymer, and the α-olefin has from 3 to about 16 carbon atoms.

5. The process according to claim 1 wherein the functionalizing agent is selected from the group consisting of unsaturated monomers containing one, or more, carboxylic acid groups and unsaturated monomers containing one, or more, acid anhydride groups.

6. The process according to claim 5 wherein the functionalizing agent is maleic anhydride.

* * * * *